United States Patent
Seo et al.

(10) Patent No.: US 6,540,823 B1
(45) Date of Patent: Apr. 1, 2003

(54) ZINC MAGNESIUM TITANATES, PROCESSES FOR PREPARING THEREOF AND THERMOREGULATING FUNCTIONAL COMPOSITIONS CONTAINING THE SAME

(75) Inventors: Dong Sung Seo, Daejeon (KR); Hong Ha Sohn, Daejeon (KR); Ji Ho Park, Daejeon (KR); Seh Hoon Kang, Daejeon (KR); Young Chang Yoo, Daejeon (KR)

(73) Assignee: LG Chemical Ltd., Seoul (KR)

( * ) Notice: Subject to any disclaimer, the term of this patent is extended or adjusted under 35 U.S.C. 154(b) by 0 days.

(21) Appl. No.: 09/720,728

(22) PCT Filed: Apr. 23, 1999

(86) PCT No.: PCT/KR99/00192
§ 371 (c)(1),
(2), (4) Date: Dec. 28, 2000

(87) PCT Pub. No.: WO00/00432
PCT Pub. Date: Jan. 6, 2000

(30) Foreign Application Priority Data

Jun. 30, 1998 (KR) .............................. 98-25563

(51) Int. Cl.$^7$ .............................................. C01G 23/00
(52) U.S. Cl. .................... 106/436; 106/416; 106/417; 106/449; 427/160; 427/215
(58) Field of Search .................. 106/416, 417, 106/449, 436; 423/578; 428/403, 404; 427/160, 215; 424/59, 401, 642, 682; 252/582, 587, 588

(56) References Cited

U.S. PATENT DOCUMENTS

| | | | |
|---|---|---|---|
| 2,139,686 A | * | 12/1938 | Lederle et al. .............. 106/436 |
| 3,607,338 A | | 9/1971 | Webb et al. |
| 3,732,702 A | | 5/1973 | Desch |
| 4,882,650 A | | 11/1989 | Maher et al. |
| 4,892,226 A | | 1/1990 | Abtahi |
| 5,237,838 A | | 8/1993 | Merritt-Munson |
| 5,353,600 A | | 10/1994 | Merritt et al. |
| 5,476,696 A | | 12/1995 | Papazian et al. |
| 5,567,490 A | | 10/1996 | Papazian et al. |

FOREIGN PATENT DOCUMENTS

| | | |
|---|---|---|
| EP | 0340313 | 11/1989 |
| JP | 63-265810 | 11/1988 |
| JP | 08-3019 | 1/1996 |
| KR | 1998-069339 | 10/1998 |

OTHER PUBLICATIONS

Derwent information for KR 98069339, Oct. 26, 1998.*

Database WPI on Questel, week 8122, London derwent Publications Ltd., AN 81–39713D, class E32, SU 763413 B (Sheubjnabb), abstract.

* cited by examiner

*Primary Examiner*—C. Melissa Koslow
(74) *Attorney, Agent, or Firm*—Birch, Stewart, Kolasch & Birch, LLP

(57) ABSTRACT

The present invention relates to a novel zinc magnesium titanate represented by formula (I): $Zn_{2-x}Mg_x \cdot yTiO_4$ in which x denotes a real number of 0.5 to 1.5; and y denotes an integer of 1 or 2, and to a process for preparing the same and a thermoregulating functional composition which comprises zinc magnesium titanate of formula (I).

6 Claims, 10 Drawing Sheets (5 of 10 Drawing Sheet(s) Filed in Color)

A : Example 1
B : Comparative Example 1
C : TiO$_2$
D : ZnO

US 6,540,823 B1

ZINC MAGNESIUM TITANATES, PROCESSES FOR PREPARING THEREOF AND THERMOREGULATING FUNCTIONAL COMPOSITIONS CONTAINING THE SAME

This application is the national phase under 35 U.S.C. §371 of PCT International Application No. PCT/KR99/00192 which has an International filing date of Apr. 23, 1999, which designated the United States of America.

TECHNICAL FIELD

The present invention relates to a novel zinc magnesium titanate represented by the following formula (I):

$$Zn_{2-x}Mg_x \cdot yTiO_4 \qquad (I)$$

in which
 x denotes a real number of 0.5 to 1.5; and
 y denotes an integer of 1 or 2, and to a process for preparing the same and a thermoregulating functional composition which comprises zinc magnesium titanate of formula (I).

Particularly, the thermoregulating functional composition according to the present invention can reflect ultraviolet rays, visible rays and infrared rays irradiated from sun to inhibit the temperature increase and further, exhibits a good adiabatic property against low temperature to maintain uniformly the temperature of the coated product. Therefore, the composition of the present invention has a thermoregulating function for the product coated therewith and also imparts good light resistance and weather resistance properties to the coated product.

BACKGROUND ART

Japanese Laid-open Patent Publication No. (Hei) 8-3019 discloses acrylic acid copolymers or crosslinked gel, for example, N-isopropylacrylamide, N-isopropylmethacrylamide, N-pentylmethacrylamide, etc., which provides a good application feeling by changing the affinity to water depending on body temperature to alter the holding amount of water. U.S. Pat. No. 5,353,600 teaches a cosmetic case into which a thermoelectric refrigeration device with an electric cell is sandwiched. In addition, U.S. Pat. Nos. 5,237,838 and 4,892,226 disclose a portable cosmetic bag for protection of the content, which is sensitive to heat, from a possible heat degradation; and U.S. Pat. No. 3.732,702 teaches a cosmetic cabinet equipped with a cooling unit for dispersion of heat and moisture generated in using it in bathroom or locker room.

As the prior art relating to inorganic pigments for the purpose of thermal control, zinc titanate used for the surface of spacecraft has been known (see NASA Contract. Rep., NASA-CR-144310, 466 pp, 1976); U.S. Pat. No. 5,401,583 discloses the use of zinc oxide and titanium dioxide as a white coating; and U.S. Pat. Nos. 5,476,696 and 5,567,490 also describe zirconium silicate which is durable to darkening caused by X-ray and ultraviolet radiation.

However, these prior inorganic pigments have generally been used for protecting the product from the short-wavelength X-ray and ultraviolet rays irradiated from universal space, but any special study for the inorganic pigment to control thermal problems by effectively reflecting ultraviolet ray B (280~320nm), ultraviolet ray A (320~400nm), visible ray (400~760 nm) and infrared ray (over 760nm), rather than ultraviolet ray C (below 280 nm) which is screened by an ozone layer at the face of the earth, has not been made.

Further, as the prior patents relating to the process for preparing inorganic pigments Japanese Laid-open Patent Publication No. (Sho) 63-265819 and U.S. Pat. No. 3,607,338 teach the process which comprises sintering titanium dioxide and zinc oxide to prepare zinc titanate and then removing the remaining zinc oxide by dissolving it with an acid. However, the inorganic pigment as prepared by the process as mentioned above did not also effectively control ultraviolet ray B, ultraviolet ray A, visible rays and infrared rays.

Meanwhile, for example, U.S. Pat. No. 4,882,650 discloses the use of magnesium titanate prepared in the form of ceramics as a dielectric substance. However, this belongs to the different group of technology, which is never related to the present invention of which the purpose is to control the temperature.

Under such technical background, the present inventors have acknowledged the necessity of a novel composition which can uniformly maintain the temperature of the coatings regardless of outside environment, for example, under variable weather such as sultry summer or cold winter in which excessive sunlight is irradiated. In order to achieve such a purpose, we have studied the inorganic pigment having a novel thermoregulating function. As a result, we have identified that a ternary system-based composite oxide comprising zinc-magnesium-titanium reflects the most of light from some wavelength in the area of ultraviolet ray C to wavelength in the area of infrared rays to inhibit an increase in temperature, and displays an excellent adiabatic property against dramatic drop of temperature to exhibit a consistent temperature maintaining effect, and farther that the cosmetic or paint composition containing such composite oxide has a thermoregulating function, and thus completed the present invention.

DISCLOSURE OF THE INVENTION

Accordingly, the purpose of the present invention is to provide a novel zinc magnesium titanate represented by the following formula (I):

$$Zn_{2-x}Mg_x \cdot yTiO_4 \qquad (I)$$

in which
 x denotes a real number of 0.5 to 1.5; and
 y denotes an integer of 1 or 2.

Another purpose of the present invention is to provide a process for preparing the inorganic pigment of formula (I) as defined above.

Still another purpose of the present invention is to provide a composition having thermoregulating function which comprises the inorganic pigment of formula (I) as an effective component.

BRIEF DESCRIPTION OF DRAWINGS

The patent or application file contains at least ones drawing executed in color. Copies of this patent or patent application publication with color drawing(s) will be provided by the Office upon request and payment of the necessary fee.

For a thorough understanding of the nature and objects of the invention, reference should be made to the following detailed description taken in connection with the accompanying drawings in which.

BEST MODE FOR CARRYING OUT THE INVENTION

Figure 1:
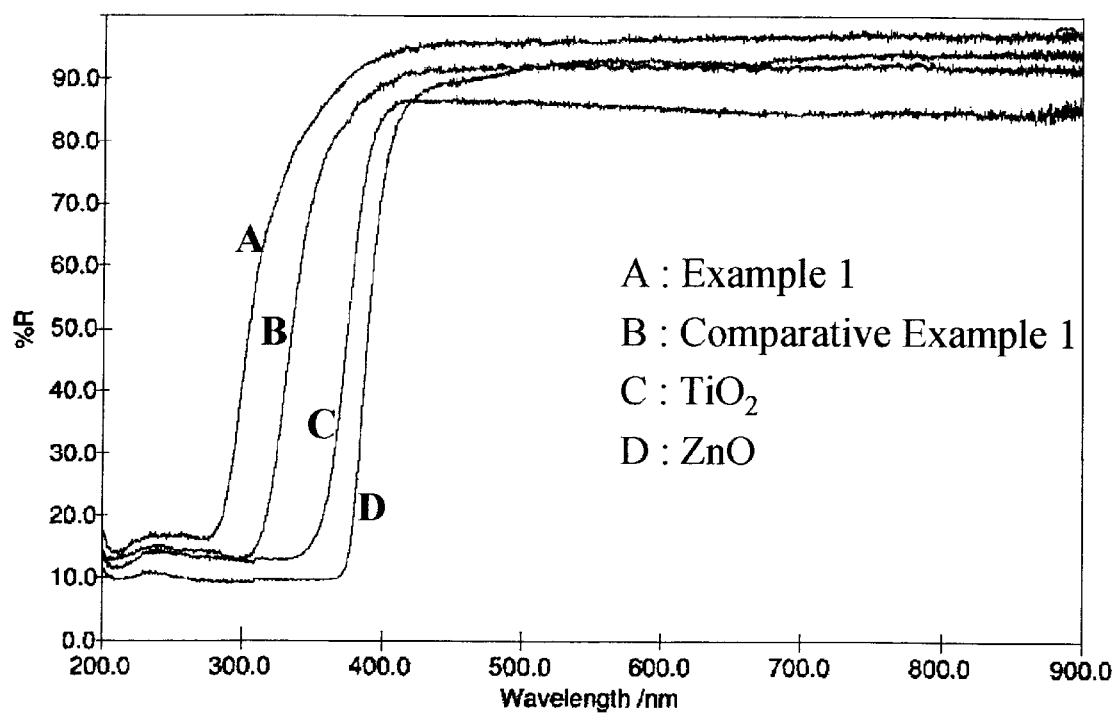
FIG. 1 is a graph showing light reflectance spectra for zinc magnesium titanate obtained from Example 1.

In zinc magnesium titanate having the chemical constitution represented by formula (I) the ratio of the equivalents of zinc and magnesium elements to the equivalent of titanium is 2:1 when y is 1, or 2:2 when y is 2. The equivalent of each of zinc and magnesium is adjusted in the range of 0.5–1.5 and their sum is always 2. The value of x below 0.5 in the above formula (I) is not preferable since zinc magnesium titanate as prepared is constituted with a high content of zinc so that in the sintering step the shrinkage rate increases and the specific gravity of sintered product also increases. Meanwhile, the value of x greater than 1.5 in the above formula (I) is also not preferable since the sintering property is poor and the physical property of the pigment becomes bulky or light. In addition, the value of y greater than 2 is also not preferable since the constitutional ratio of titanium element is high to decrease the reflective efficiency for ultraviolet rays.

The pigmentary zinc magnesium titanate according to the present invention can be prepared by a process which comprises combining a titanium-source compound, a zinc-source compound and a magnesium-source compound in the equivalent ratio as represented in the formula (I), grinding the mixture, sintering the ground mixture for 1 to 10 hours at a temperature ranging from 900° C. to 1300° C. and then cooling and grinding the sintered product.

More specifically, the titanium-source compound such as titanium dioxide, titanium sulfate, etc., the zinc-source compound such as zinc oxide, zinc carbonate, zinc phosphate, etc., and the magnesium-source compound such as magnesium oxide, magnesium carbonate, magnesium hydroxide, etc. are weighed and uniformly mixed in the constitutional ratio as in the formula (I), and the resulting mixture is ground with a mortar mill (Labo-Mill$^R$) or a ball mill. The ground mixture is sintered for 1 to 10 hours at the temperature adjusted within the range of 900° C. to 1300° C. in an electric furnace, and the sintered product is then slowly cooled and ground to obtain the desired zinc magnesium titanate in the form of particulate having a particle diameter of 0.1 to 3 $\mu$m.

Meanwhile, the flake inorganic pigment which is coated with zinc magnesium titanate can be prepared by a process characterized in that a flake inorganic pigment is dispersed in an aqueous phase, the titanium-source compound, the zinc-source compound and the magnesium-source compound are dissolved in the aqueous phase in the constitutional ratio as in the formula (I) and the resulting solution is elevated to 40 to 80° C. titrated with an alkali filtered, washed with water, dried and then sintered at 700 to 1300° C.

As the flake inorganic pigment as the base for coating, one or more selected from the group consisting of talc, mica, sericite and kaolin can be used. The water-soluble salts of titanium-source, zinc-source and magnesium-source compounds which are added so as to have the same constitutional ratio as zinc magnesium titanate of formula (I) are applied in an amount of 10 to 60 wt % with respect to the flake inorganic pigment as the base material. For this purpose, one selected from titanium tetrachloride and titanium sulfate is weighed in terms of the constitutional ratio of titanium in the formula (I); one selected from magnesium nitrate, magnesium chloride and magnesium sulfate is weighed in terms of the constitutional ratio of magnesium in the formula (I); and one selected from zinc chloride and zinc sulfate is weighed in terms of the constitutional ratio of zinc in the formula (I). Then, they are together dispersed and dissolved in the aqueous phase. Thereafter, the flake inorganic pigment and the aqueous phase as prepared above are heated to 40 to 80° C. with stirring, and at the same temperature, in order to coprecipitate titanium, magnesium and zinc one selected from sodium hydroxide, potassium hydroxide and ammonia is dissolved in $1/3$~$1/10$ times volume of water with respect to the aqueous phase and then added dropwise to the aqueous phase, thereby conducting alkali titration. According to such alkali titration titanium hydrate, magnesium hydrate and zinc hydrate are coprecipitated and, at the same time, adsorbed and coated together with titanium dioxide which is dispersed in the aqueous phase, on the surface of the flake inorganic pigment.

Meanwhile, instead of the water-soluble salts such as titanium tetrachloride or titanium sulfate, titanium dioxide can also be used as the titanium-source compound. In such a case, titanium dioxide can be dispersed together with the flake pigment(substrate) and then magnesium salt and zinc salt are adsorbed thereto to prepare the flake inorganic pigment coated with zinc magnesium titanate on the surface. That is, together with the flake inorganic pigment used as the base material titanium dioxide of which the amount is calculated from the given amounts of magnesium salt and zinc salt used for coating and the constitution of formula (I) is weighed and dispersed in the aqueous phase. The amount of the aqueous phase used for dispersion is suitably 5 to 10 times the total weight of the flake inorganic pigment and titanium dioxide. Specifically, the aqueous phase in which the flake inorganic pigment, titanium dioxide, magnesium salt and zinc salt are dispersed or dissolved is heated to 40 to 80° C. with stirring. At the same temperature, in order to coprecipitate magnesium and zinc one selected from the group consisting of sodium hydroxide, potassium hydroxide and ammonia is dissolved in $1/3$~$1/10$ times volume of water with respect to the aqueous phase and then added dropwise to the aqueous phase to conduct alkali titration. According to such alkali titration magnesium ion and zinc ion are coprecipitated in the form of magnesium hydrate and zinc hydrate, which are, at the same time, adsorbed and coated together with titanium dioxide which is dispersed in the aqueous phase, on the surface of the flake inorganic pigment.

The dropwise addition of alkaline solution is continued until the dramatic increase in the viscosity of the solution is observed with generating white turbid in the pH range of 7 to 9.5. After the coprecipitation and adsorptive coating procedures is completed, the reaction mixture is aged by standing it for 3 hours or more at room temperature and then filtered and washed with purified water to remove the unreacted residue. The resulting product is dried at 110° C. to obtain the pigment which is then sintered in an electric furnace at the temperature ranging from 700° C. to 1300° C. for 1 to 10 hours and then slowly cooled. Then, the sintered product is ground to obtain the flake inorganic pigment coated with zinc magnesium titanate on its surface.

The zinc magnesium titanate and the flake inorganic pigment coated with zinc magnesium titanate as prepared according to the above-mentioned process are a novel functional inorganic pigment having thermoregulating function by efficiently and selectively reflecting the light in the area of ultraviolet ray B and A, visible rays and infrared rays to inhibit the temperature increase and further displaying an excellent adiabatic property under low temperature environment to maintain uniformly the temperature.

In general, the substance absorbs the energy supplied from the external energy source to occur the temperature increase. The forms of energy which causes the temperature increase include heat energy, electric energy, light energy, frictional (kinetic) energy, etc. Among them, the temperature increase of the substance caused by light energy depends upon the properties possessed by the substance against light, i.e. optical properties for absorption, scattering, refraction and reflection. Among the optical properties of the substance, the reflectance is most deeply involved in the temperature increase. That is, how much the incident light from the outside is reflected by the substance influences the extent of the temperature increase. In addition, in the case of light energy the more wavelength of the light is short, the more the intensity of energy is great. The light energy irradiated to the face of earth is mostly originated from ultraviolet rays B and A, visible rays, except for the light having short wavelength such as ultraviolet ray C which is screened by an ozone layer. Therefore, in order to inhibit the temperature increase of the substance it is required to reflect as much as possible the light irradiated from the outside like as mirror.

The composition containing the inorganic pigment according to the present invention has the thermoregulating function by reflecting ultraviolet rays B and A, visible rays and infrared rays irradiated from sun to inhibit the temperature increase and further exhibiting an excellent adiabatic property under low temperature environment to maintain uniformly the temperature. Thus, the purpose of the present invention is to provide such a functional composition.

Typical example of the functional composition according to the present invention includes cosmetic and paint compositions.

The cosmetic composition contains as the effective component zinc magnesium titanate preferably in an amount of 0.1 to 60.0 wt % with respect to the total weight of the composition. When zinc magnesium titanate is contained in an amount below 0.1 wt %, the thermoregulating function cannot sufficiently be displayed, whereas when the amount of zinc magnesium titanate is more than 60.0 wt %, it is uneconomical since the increase in the used amount does not induce the proportional increase of the desired effect. The amount of zinc magnesium titanate combined in the composition can be determined within the above defined range from 0.1 to 60.0 wt % depending on the formulation of cosmetics and the desired thermoregulating function.

In the paint composition, zinc magnesium titanate according to the present invention is also contained as the effective component to exhibit a good thermoregulating effect and further light resistance and weather resistance properties. The preferable amount of zinc magnesium titanate in the composition is 0.1 to 80.0 wt % with respect to the total weight of the composition. When the content of zinc magnesium titanate in the paint composition is beyond the above defined range, the same problems as in the above cosmetic composition may occur. Particularly, in the case of white paints the paint composition can be composed of zinc magnesium titanate according to the present invention as the main component. For the coloured paints zinc magnesium titanate according to the present invention can be combined within a suitable range to constitute the paint composition having a thermoregulating function.

Hereinafter, the present invention is more specifically explained by the following examples and experiments. However, it should be understood that these examples and experiments are intended only to help clear understanding of the present invention and the present invention is not limited to these examples in any manner.

EXAMPLE 1

81.4 g of zinc oxide, 40.3 g of magnesium oxide and 79.9 g of anatase titanium dioxide were weighed and then mixed and ground using a mortar mill (Labo Mill, Mitto, Japan) for 10 minutes. The ground mixture was placed in an alumina crucible of electric furnace (Lenton Thermal Co., England). The temperature of electric furnace was elevated at the rate of 5° C. per minute to sinter the mixture for 4 hours at 1000° C. and then cooled at the rate of 15° C. per minute. The cooled sintered product was ground with an atomizer (Hosokawa-Micron, Japan) to obtain 200 g of zinc magnesium titanate.

COMPARATIVE EXAMPLE 1

The known zinc titanate was prepared according to the same procedure as Example 1 of U.S. Pat. No. 3,607,338.

Experiment 1

Light Reflectance

The light reflectance of zinc magnesium titanate prepared in Example 1 was measured using a spectrophotometer (UV-VIS Spectrophotometer, Varian, Australia) within the wavelength range of 200 nm to 900 nm. In order to compare the light reflectance, light reflectances of zinc titanate prepared in Comparative Example 1, titanium dioxide used as ultraviolet ray screening agent, and zinc oxide were also measured. The reflectance spectra as measured are depicted in FIG. 1.

As can be seen from FIG. 1, the light reflectance spectrum of zinc magnesium titanate according to the present invention as prepared in Example 1 shows blue shift of approximately 30 nm in comparison to zinc titanate of Comparative Example 1 and of approximately 80~100 nm in comparison to titanium dioxide and zinc oxide. In addition, from the light reflectance spectra depicted in FIG. 1 it can also be seen that zinc magnesium titanate of Example 1 begins to reflect the light at 280 nm and reflects most of the area of ultraviolet rays B and A and a part of wavelength of visible rays and infrared rays.

Experiment 2

Observation with Electron Microscope

Figure 2:
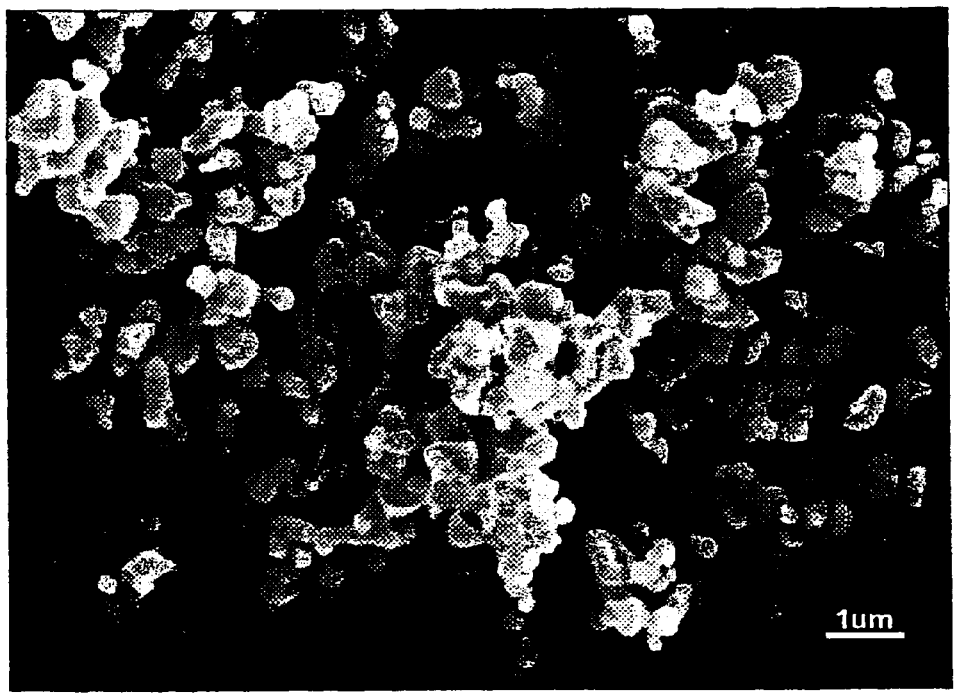
FIG. 2 is an electron micrograph (×10,000) showing the particle shape of zinc magnesium titanate obtained from Example 1.

The shape of particles of zinc magnesium titanate prepared in Example 1 was observed with an electron microscope (SEM, Jeol, Japan) and the result thereof is shown in FIG. 2. As can be seen from the electron micrograph of FIG. 2, zinc magnesium titanate has the uniform particle shape having particle diameter of 0.8~1.0 μm.

Experiment 3

X-ray Diffraction Analysis

Figure 3:
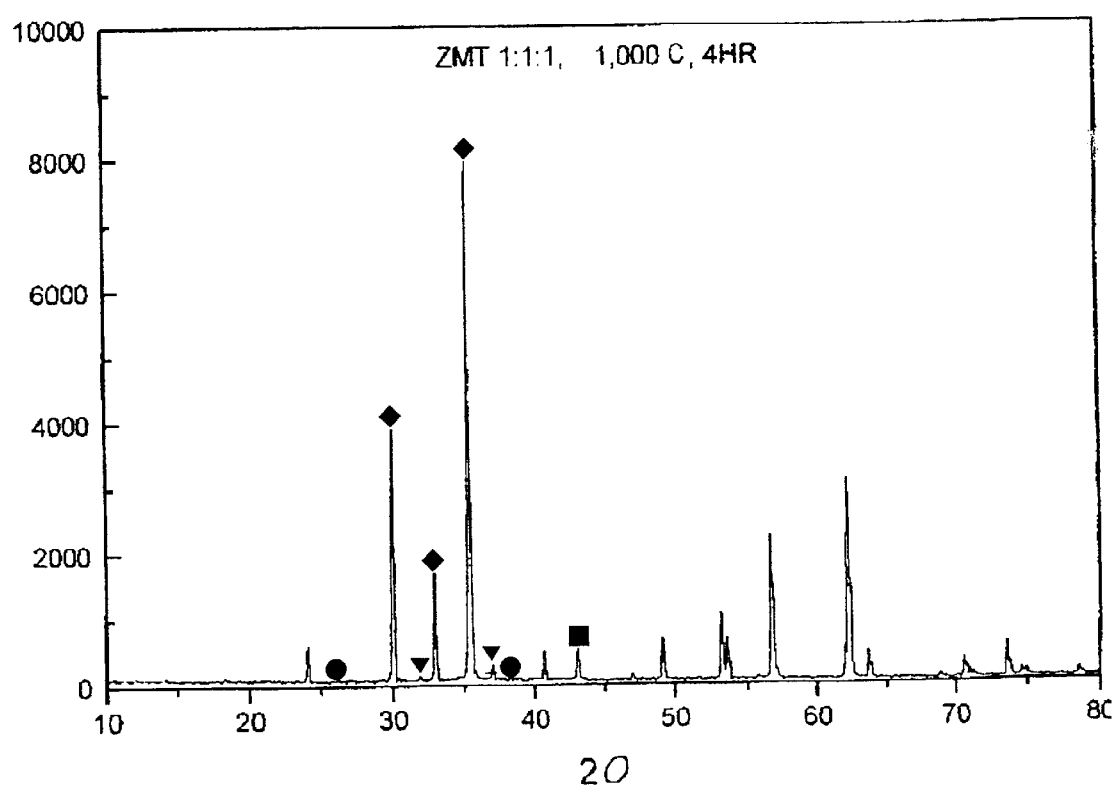
FIG. 3 represents a X-ray diffraction pattern of zinc magnesium titanate obtained from Example 1.

To confirm the crystal structure of zinc magnesium titanate prepared in Example 1 according to the present invention the crystal pattern of zinc magnesium titanate was determined using XRD (Rigaku, Japan) and the result thereof is shown in FIG. 3. As can be seen from FIG. 3, the characteristic peaks of zinc magnesium titanate (indicated by ♦) occur at the positions of 35.5°, 30° and 33° with a very great intensity. These are clearly distinguished from the peak positions 26° and 38° for titanium dioxide (indicated by ●), the peak positions 32° and 37° for zinc oxide (indicated by ▼) and the peak position 43 for magnesium oxide (indicated by ■). That is, it can be seen that in the zinc magnesium titanate according to the present invention the characteristic peaks of titanium dioxide, zinc oxide and magnesium oxide are disappeared or present only as the trace.

Experiment 4

Effect of Inhibiting Temperature Increase and Adiabatic Property Against Low Temperature As the comparative materials for measurement of the temperature increase at the surface of zinc magnesium titanate prepared in Example 1 according to the present invention, zinc titanate prepared in Comparative Example 1, anatase titanium dioxide and zinc oxide were used. To measure the surface temperature about 0.5 g of the pigment was molded with pressure to prepare the round specimen having diameter of 1 cm, which was previously adapted by standing for 2 hours or more in a constant temperature and humidity chamber with maintaining inner temperature 22° C. and relative humidity 45%. Each specimen was placed on black art paper and then the initial surface temperature of the specimen was measured using an infrared thermometer (Spot Thermometer TA-0510F, Minolta, Japan) which was equipped at 30 cm above the specimen in a perpendicular direction. As the energy source for irradiation to the specimen, a halogen lamp (500W) from which ultraviolet rays, visible rays and infrared rays are together emitted was equipped at 50 cm above the specimen in a perpendicular direction and then the light was irradiated therefrom for 10 minutes to each specimen. After the light was shut down, the specimen was allowed to stand for 10 seconds in order to remove any influence of air and then the surface temperature of each specimen was measured. The variation in temperature before and after irradiation was measured.

Meanwhile, the adiabatic property against low temperature was determined by standing the specimen, which was previously adapted for 2 hours in a constant temperature and humidity chamber, for 30 minutes at 4° C. in a cryostat and, immediately after taking off the specimen from the cryostat, measuring the surface temperature with an infrared thermometer in a constant temperature and humidity chamber. The results as obtained are given in the following Table 1.

TABLE 1

| Variation in the surface temperature of each specimen (unit:° C.) | | | | | | |
|---|---|---|---|---|---|---|
| Specimen | Before radiation | After radiation | ΔT | Before cooling | After cooling | ΔT |
| Example 1 | 22.0 | 68.5 | 46.5 | 22.0 | 16.5 | 5.5 |
| Comparative Example 1 | 22.0 | 72.1 | 50.1 | 22.0 | 11.3 | 10.7 |
| Titanium dioxide | 22.0 | 78.5 | 56.5 | 22.0 | 9.8 | 12.2 |
| Zinc oxide | 22.0 | 73.7 | 51.7 | 22.0 | 10.1 | 11.9 |

From the results given in the above Table 1, it can be seen that the effect of inhibiting temperature increase and the adiabatic property against low temperature of zinc magnesium titanate according to the present invention are far better than those of the known zinc titanate, titanium dioxide and zinc oxide.

Experiment 5

Photocatalytic Activity

In general, the inorganic pigments show the different extent of dye adsorption depending on the difference in their specific surface area and adsorptivity. Therefore, when each pigment is dispersed in the dye solution having the same concentration, different amount of dye is adsorbed on the pigment surface to make a difference in the amount of pigment present in the aqueous solution which causes the difference in absorbance. Upon irradiation of light thereto, due to the photocatalytic activity generated from the solid surface of each pigment the dye adsorbed on the pigment is decomposed and consumed. Then, the pigment continuously adsorbs the dye present in the aqueous solution as much as the decomposed and consumed concentration of dye. Therefore, depending on the light irradiation time and the intensity of photocatalytic activity of dye the dye concentration in the aqueous solution decreases at the different rate.

Under such theoretical basis, the following experiment was practiced in order to identify whether the zinc magnesium titanate prepared in Example 1 according to the present invention occurs the result such as discoloration, decoloration, etc., due to photocatalytic activity upon irradiation of ultraviolet rays when it was combined with the dye. For the purpose of comparison, the same experiment was conducted for each of zinc titanate prepared in Comparative Example 1, titanium dioxide and zinc oxide.

Each specimen was mixed with and dispersed in the standard test solution, in which blue dye No. 1 (Brilliant Blue FCF) as the water-soluble dye was previously dissolved at a certain concentration, at the concentration of 5 wt %. Using Sun Tester (Heraeus, U.S.A.) the light was irradiated to the dispersion specimen at the irradiation intensity of 765W/m$^2$ for 1, 3, 5 hours. During this period, the given amount of each specimen was taken and centrifuged. The absorbance of blue dye No. 1 having $\lambda_{max}$ of 630 nm was measured at 630 nm with UV-VIS spectrophotometer to compare the extent of decomposition due to the photocatalytic activation with each other. The decreasing rate of concentration of the water-soluble dye was represented in a percentage (%) obtained by dividing the absorbance measured 5 hours after irradiation by the absorbance before irradiation. The obtained results are given in the following Table 2.

TABLE 2

Discoloration and decoloration degree of dye according to the solar radiation quantity (unit:absorbance at 630 nm)

| Specimen | Before radiation | 1 hour | 3 hours | 5 hours | Decreasing rate (%) |
|---|---|---|---|---|---|
| Example 1 | 2.68 | 2.53 | 2.35 | 2.21 | 17.54 |
| Zinc titanate | 2.70 | 2.36 | 2.04 | 1.85 | 31.48 |
| Titanium dioxide | 2.51 | 0.85 | 0.29 | 0.13 | 94.28 |
| Zinc oxide | 1.76 | 1.08 | 0.54 | 0.24 | 86.37 |

Figure 4:
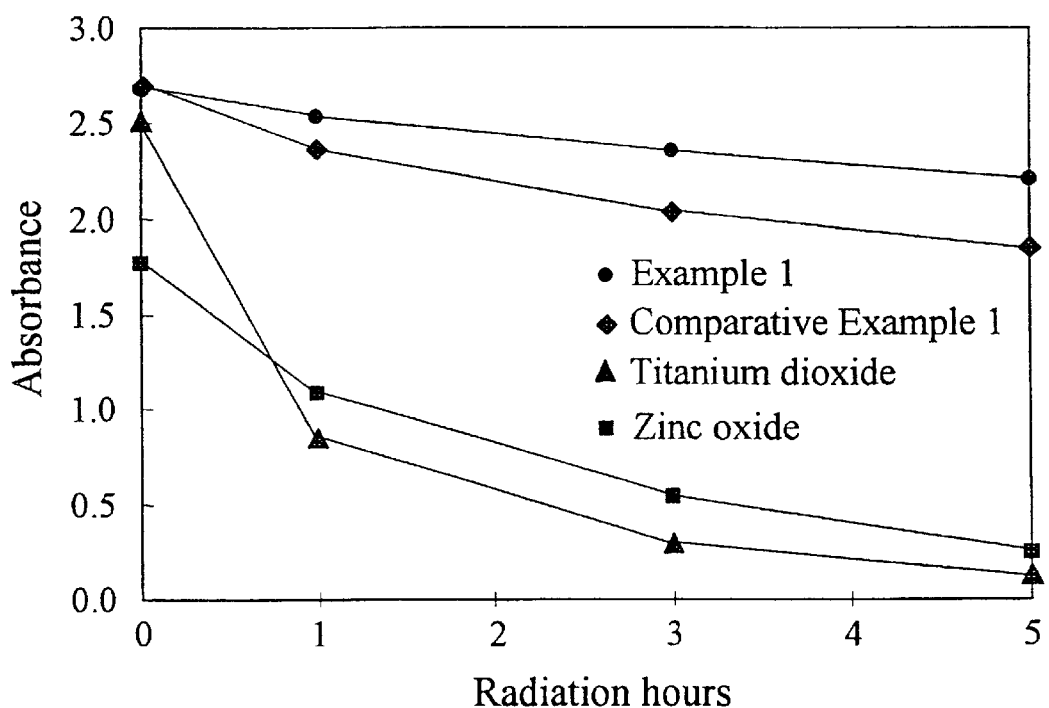
FIG. 4 represents a photocatalytic activity of zinc magnesium titanate obtained from Example 1.

From the absorbance before radiation as described in the above Table 2, it can be seen that the saturation adsorption quantity of the specimen obtained in Example 1 is similar to that of zinc titanate or titanium dioxide but the saturation adsorption quantity of zinc oxide is relatively great. In addition, it can also be seen that from the result of decreasing rate the zinc magnesium titanate has substantially no photocatalytic activity in comparison to titanium dioxide, zinc oxide and zinc titanate as the comparative materials. Meanwhile, from FIG. 4 which is a graph showing the decreasing tendency of absorbance of the water-soluble dye, it can be noted that the absorbance decreasing slope of the zinc magnesium titanate according to the present invention is most gentle whereas the absorbance decreasing slope of titanium dioxide is most sharp. From such result, it can be identified that the zinc magnesium titanate has the lowest photocatalytic activity.

EXAMPLE 2

30.5 g of magnesium chloride and 43.1 g of zinc sulfate were dissolved in 2000 ml of purified water, and 70.0 g of mica and 12.0 g of titanium dioxide were added and dispersed therein. The resulting dispersion was warmed with stirring to maintain the temperature of the aqueous phase at 70° C. 24.0 g of sodium hydroxide was dissolved in 200 ml of purified water and then slowly added dropwise thereto. When the pH value of the aqueous phase reaches around 8, aqueous solution of sodium hydroxide was carefully added dropwise until the pH value reaches 8.5. After stopping the addition, the mixture is cooled to room temperature and then allowed to stand for 3 hours. Then, the mixture was filtered, washed with 1000 ml of purified water and then filtered again. The resulting product obtained by re-filtration was dried at 110° C. for 3 hours and ground with a mortar mill for 30 seconds. The ground product was placed in an alumina crucible of electric furnace of which the temperature was elevated at the rate of 5° C. per minute to sinter the product for 4 hours at 1000° C. and then cooled at the rate of 15° C. per minute. The cooled sintered product was ground with an atomizer to obtain 100 g of zinc magnesium titanate-coated mica.

Experiment 6

Observation with Electron Microscope

Figure 5:
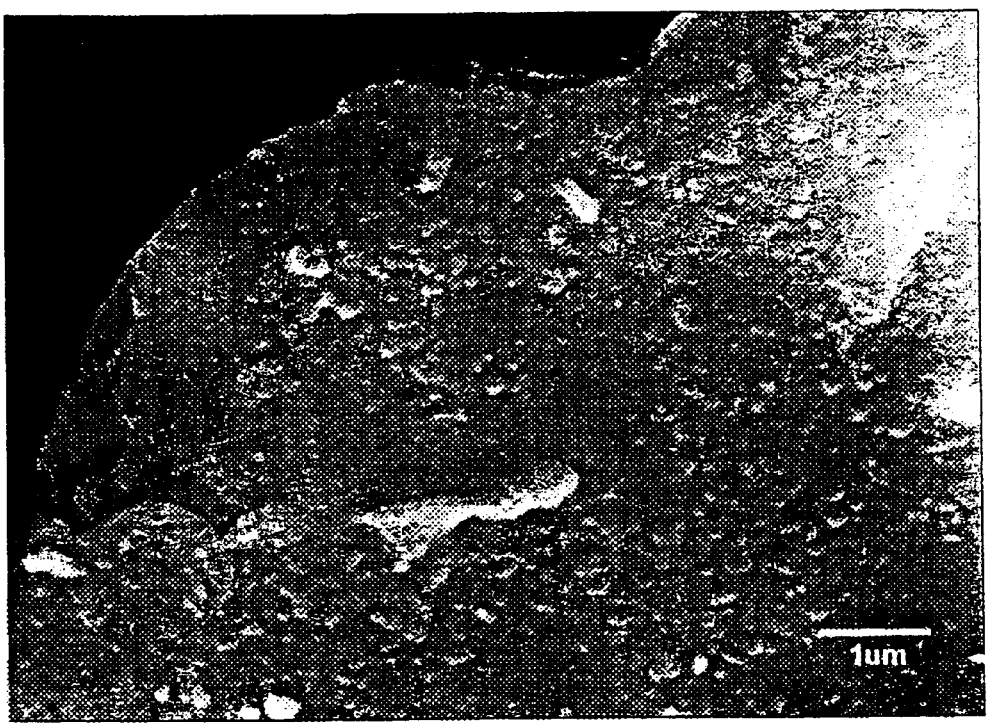
FIG. 5 is an electron micrograph (×10,000) showing the particle shape of zinc magnesium titanate obtained from Example 2.

The shape of particles of zinc magnesium titanate-coated mica as prepared in Example 2 was observed with an electron microscope of 10,000 magnifications and the result thereof is shown in FIG. 5. As can be seen from the electron micrograph of FIG. 5, in zinc magnesium titanate-coated mica the surface of flake mica was coated with zinc magnesium titanate particles having diameter of 0.3 μm in a tightly fixed state.

EXAMPLE 3

In a 2000 ml-reaction vessel 70.0 g of sericite was dispersed in 430 ml of purified water and warmed with stirring to maintain the temperature of the aqueous phase at 80° C. 50 g of magnesium chloride and 50 g of zinc sulfate were dissolved in 400 ml of purified water and then warmed to maintain the temperature of 80° C. Separately, 50.0 g of titanium tetrachloride was dissolved in 300 ml of cold purified water. To the reaction vessel in which sericite was dispersed and stirred were slowly added aqueous solution of titanium tetrachloride and the mixed aqueous solution of magnesium chloride and zinc sulfate in this order with maintaining the temperature of 75° C. The aqueous solution of 80 g of sodium hydroxide dissolved in 400 ml of purified water was slowly added dropwise thereto. As soon as the pH value of the aqueous phase in the reaction vessel exceeds 8, the addition of aqueous solution of sodium hydroxide was ceased and then the mixture was carefully and continuously stirred for 3 hours at 75° C. Then, the mixture was allowed to stand for 5 hours at room temperature, washed three times with purified water and then filtered. The resulting product obtained by filtration was dried at 110° C. and then placed in an alumina crucible of electric furnace of which the temperature was elevated at the rate of 5° C. per minute to sinter the product for 2 hours at 900° C. and then cooled at the rate of 15° C. per minute. The sintered product was ground with an atomizer to obtain 100 g of zinc magnesium titanate-coated sericite.

EXAMPLE 4 AND COMPARATIVE EXAMPLE 2

Zinc magnesium titanate prepared in Example 1 was treated with 3.0 wt % of reactive silicone oil to impart a water resistance. Then, two-way cakes containing such silicone oil-treated zinc magnesium titanate were prepared so that they have the constitutional ratios given in the following Table 3.

TABLE 3

Compositions of raw materials for two-way cakes (unit:wt %)

| Raw materials | Example 4 | Comparative Example 2 |
|---|---|---|
| 1. Silicone-treated sericite | balance | balance |
| 2. Silicone-treated talc | 20.00 | 20.00 |
| 3. Silicone-treated mica | 15.00 | 15.00 |
| 4. Silicone-treated zinc magnesium titanate | 15.00 | — |
| 5. Silicone-treated titanium dioxide | — | 10.00 |
| 6. Silicone-treated zinc oxide | — | 5.00 |
| 7. Red iron oxide | 0.75 | 0.75 |
| 8. Yellow iron oxide | 3.80 | 3.80 |
| 9. Black iron oxide | 0.45 | 0.45 |
| 10. Zinc stearate | 1.00 | 1.00 |
| 11. Dimethylpolysiloxane | 3.00 | 3.00 |
| 12. Squalane | 2.80 | 2.80 |
| 13. Lanoline | 2.00 | 2.00 |
| 14. Isopropylmyristate | 2.00 | 2.00 |
| 15. Combined perfume | q.s. | q.s. |
| 16. Preservative | q.s. | q.s. |

Experiment 7

Thermoregulating Effect of Two-Way Cake

The effect of inhibiting temperature increase in two-way cakes obtained in the above Example 4 and Comparative Example 2 were compared to each other as follows. Two-way cakes was formulated, filled in a refill container, and then previously left for one day in a constant temperature and humidity chamber of relative humidity 50% and inner temperature 22.0° C. To determine the effect of inhibiting temperature increase a 500W halogen lamp was equipped at 50 cm above the product and then the light was irradiated therefrom to the product for 2 minutes. The lamp was switched off and, after 10 seconds, the temperature at the center of the product was measured with an infrared digital thermometer. Meanwhile, the adiabatic property against low temperature was determined by standing two-way cakes which was adapted for 2 hours in a constant temperature and humidity chamber, for 30 minutes at 4° C. in a cryostat and, immediately after taking off them from the cryostat, measuring the surface temperature with an infrared thermometer in a constant temperature and humidity chamber. The results as obtained are given in the following Table 4.

TABLE 4

Comparison of effects of inhibiting temperature increase in two-way cakes (unit:° C.)

|  | Before radiation | After radiation | ΔT | Before cooling | After cooling | ΔT |
| --- | --- | --- | --- | --- | --- | --- |
| Example 4 | 22.5 | 37.6 | 5.6 | 22.5 | 7.3 | 2.1 |
| Comparative Example 2 | 22.5 | 43.2 |  | 22.5 | 5.2 |  |

From the result described in the above Table 4, it can be seen that upon light radiation the two-way cake of Example 4 which contains zinc magnesium titanate according to the present invention possesses the effect of inhibiting temperature increase to the extent of 5.6° C. in comparison to the two-way cake of Comparative Example 2 and when they are forcibly cooled in a cryostat, the two-way cake of Example 4 exhibits the effect of maintaining temperature to the extent of 2.1° C. Since the effect of inhibiting temperature increase to 5.6° C. and the adiabatic effect of 2.1° C. are the significant level at which the human body, particularly face, can sufficiently feel such difference in temperature, it can be identified that the use of the two-way cake according to the present invention provides an effect of regulating temperature of the surface of facial skin.

Meanwhile, the thermoregulating and make-up effects for two-way cakes prepared in Example 4 and Comparative Example 2 were determined using D.I.T.I. system (Digital Infrared Thermal Imaging System; Thermo Tracer 6T62, NEC San-ei, Japan) to obtain the image for thermal distribution. The obtained images were compared with each other in photographs of FIGS. 6 to 10. D.I.T.I. system used in this experiment provides the image photograph which represents the temperature distribution of the substance by the tone of colors.

Figure 6:
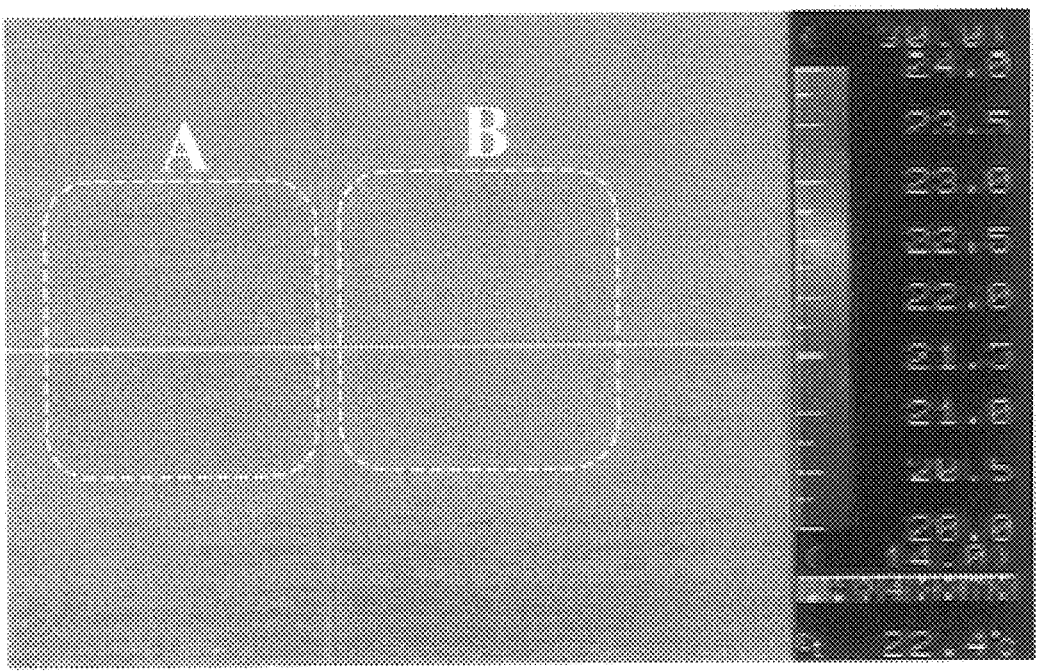
FIG. 6 represents the result obtained by measuring the temperature distribution of the molded products produced from Example 4 and Comparative Example 2 upon storage at room temperature with D.I.T.I. system (Digital Infrared Thermal Imaging System)
Figure 7:
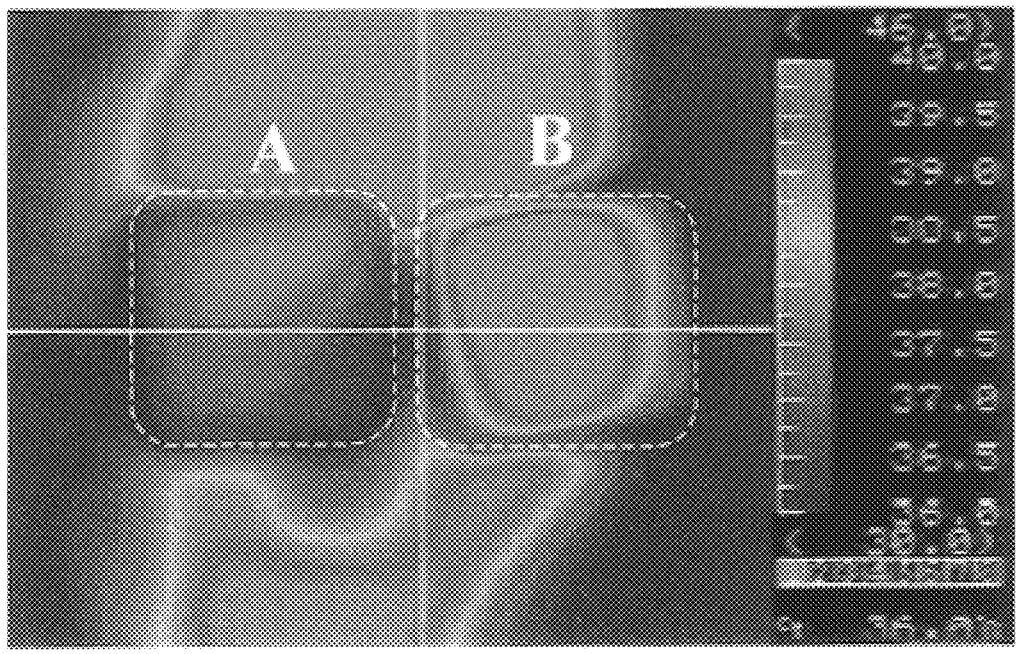
FIG. 7 represents the result obtained by measuring with D.I.T.I. system the temperature distribution of the molded products produced from Example 4 and Comparative Example 2 each of which was stored for a certain period at room temperature and then subjected to the light radiation.
Figure 8:
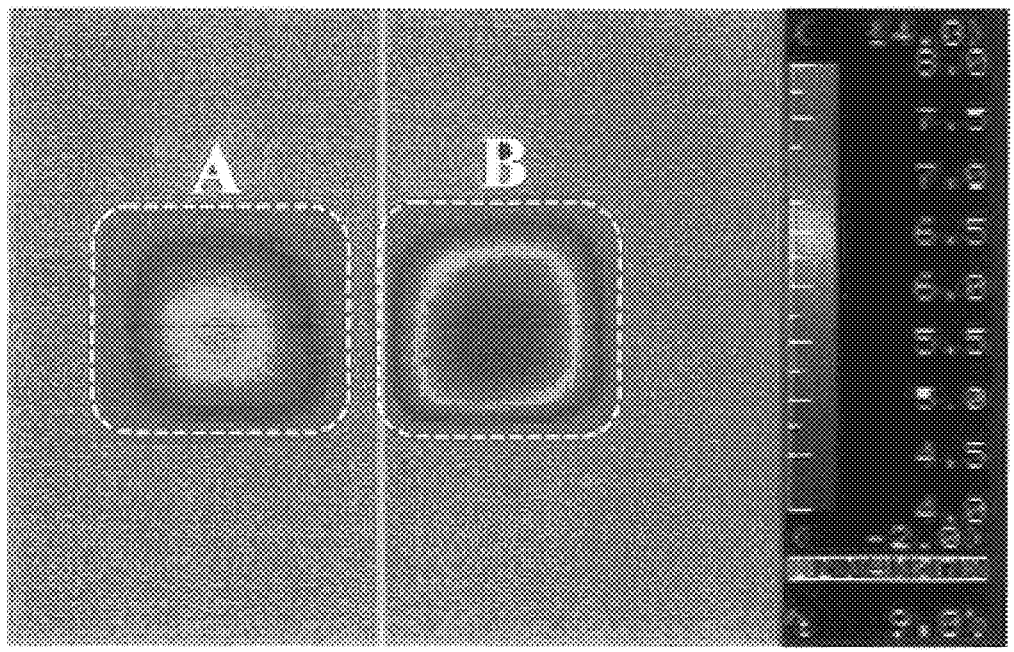
FIG. 8 represents the result obtained by measuring with D.I.T.I. system the temperature distribution of the molded products produced from Example 4 and Comparative Example 2 upon cooling in a refrigerator.

Specifically, FIGS. 6 to 8 show the result measured by D.I.T.I. system in order to visually confirm the thermoregulating functions due to the effect of inhibiting temperature increase and adiabatic effect for the two-way cake containing zinc magnesium titanate according to the present invention and the general two-way cake. Among them, FIG. 6 shows the result obtained by measuring the two-way cake, which was placed in a constant temperature and humidity chamber for one day or more, with D.I.T.I. system. In this figure, the thermal distributions of the two-way cake of Example 4 (left, designated A) and the two-way cake of Comparative Example 2 (right, designated B) show the substantially same tone of color to each other. The temperature values for the corresponding tone of color as given at the right side of the figure suggest that the two-way cake and the adhesive plate therefor have the substantially identical temperature to each other. FIG. 7 shows the result obtained by irradiating the light to each two-way cake from halogen lamp for 3 minutes and then measuring them with D.I.T.I. system. In this figure, the temperature of two-way cake prepared in Example 4 (left, designated A) is below 37.5° C. and manifested by a very deep blue color, and the temperature of two-way cake prepared in Comparative Example 2 (right, designated B) is 40° C. or more and manifested by a reddish-brown color which shows visually the increase in temperature of the product. In addition, it can be seen that the irradiated light increases temperature of the adhesive plate used for fixing the two-way cakes for the purpose of comparison with each other by 40° C. or more to cause the change of color around the product into reddish-brown color. This allows to more clearly explain the thermoregulating function of the two-way cake containing zinc magnesium titanate according to the present invention. FIG. 8 shows the result obtained by standing the two-way cake for 30 minutes at 4° C. in a cryostat and then measuring them with D.I.T.I. system. In this figure, the two-way cake of Example 4 (left, designated A) manifests a very deep red color and the two-way cake of Comparative Example 2 (right, designated B) manifests a blue color. This visibly shows that the two-way cake containing zinc magnesium titanate has a good adiabatic effect to display the thermoregulating function due to the heat retention.

Meanwhile, in order to identify the influence of the effect of inhibiting temperature increase upon the skin temperature the variation of temperature in the region of face was measured for 30 woman subjects with an infrared digital thermometer in a constant temperature and humidity chamber. As the result, it can be seen that when the light from halogen lamp is irradiated to them for 2 minutes in the chamber, the mean skin temperature increases by average 3.2° C. from 32.5° C. to 35.7° C. and when the face is exposed outdoors to the sunlight for 10 minutes as in the summer season, the temperature at the surface of face increases even by 39° C. to 41° C. to show an temperature increase of about 8° C. The human body is sensitive to temperature in the order of the lips, face, midriff, arms and legs and can feel the difference in temperature of about 3° C. when the temperature stimulus is very slowly given and even the temperature difference of about 0.1° C. and below in the case of very rapid temperature stimulus. Therefore, from the results shown in FIGS. 6 to 8 it can be noted that the two-way cake containing zinc magnesium titanate according to the present invention displays the thermoregulating function by which an increase of skin temperature due to light radiation is inhibited and further the decrease of skin temperature due to cold weather is controlled, thereby maintaining the comfortable skin condition.

Figure 9:
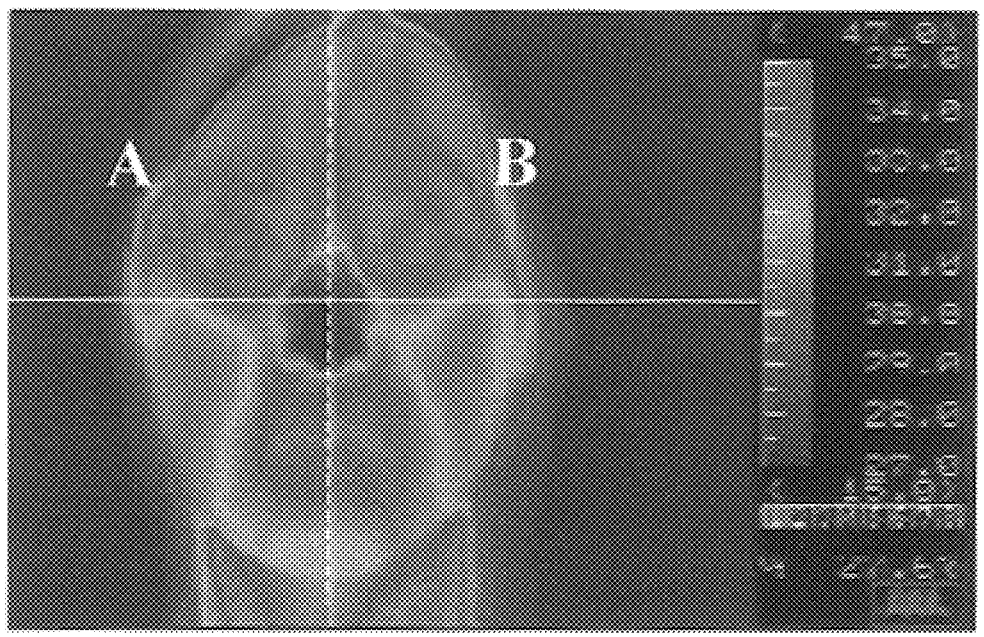
FIG. 9 represents the result obtained by measuring the temperature distribution in the unpowdered face of the test subject with D.I.T.I. system.
Figure 10:
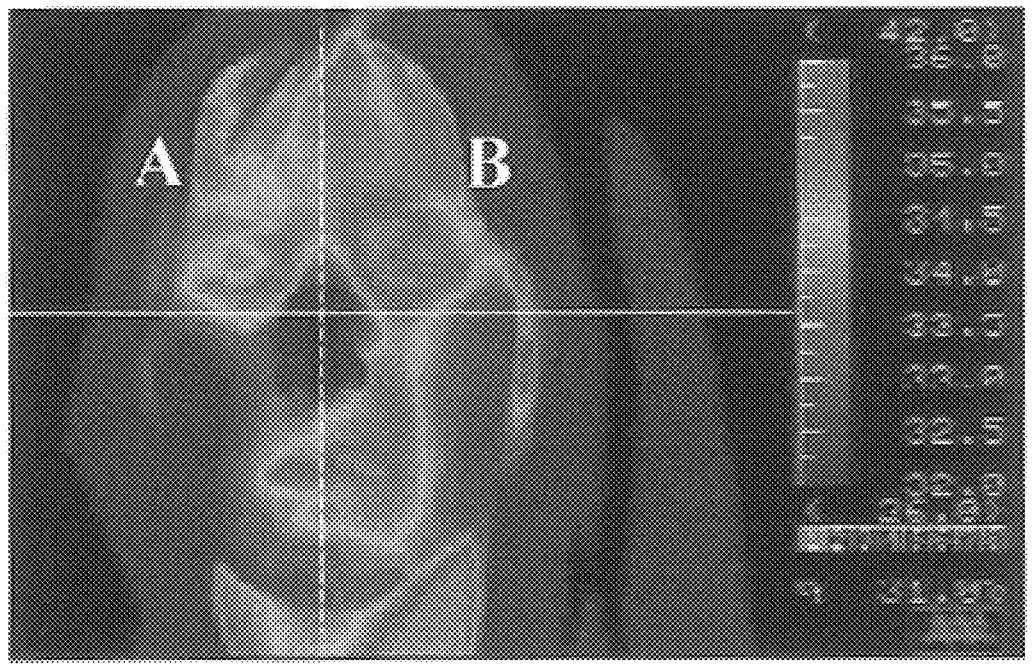
FIG. 10 represents the result obtained by measuring with D.I.T.I. system the temperature distribution in the face of the test subject after the molded products produced in Example 4 and Comparative Example 2 were uniformly applied to the both sides of the subjects face centering around nose and then the light was irradiated thereto.

FIG. 9 shows the result obtained by measuring the unpowdered face of healthy subject with D.I.T.I. system in a constant temperature and humidity chamber. As can be seen from this figure, the thermal distributions on right and left sides of the face are symmetric to each other. FIG. 10 shows the result obtained by uniformly coating the two-way cake of Example 4 (designated A) on the left side of subject's face and the two-way cake of Comparative Example 2 (designated B) on the right side of subject's face centering around nose as the boundary, irradiating the light from halogen lamp to the face for 3 minutes and then measuring them with D.I.T.I. system. As can be seen from FIG. 10, the left side of face on which the two-way cake of Example 3 was coated (designated A) has the greater area showing blue color tone in comparison to the right side coated with the two-way cake of Comparative Example 2 (designated B). Particularly, it can be seen that the temperature deviation at the parts to which the light is irradiated near 90°, for example, forehead, cheek, around mouth, etc. is great. That is, from the result of FIG. 10, it could be identified that the two-way cake containing zinc magnesium titanate according to the present invention has an excellent thermoregulating function for skin.

EXAMPLE 5 AND COMPARATIVE EXAMPLE 3

Lacquer Enamel Paints

The white lacquer enamel paints having the constitutional ratio given in the following Table 5 were prepared.

TABLE 5

Composition of lacquer enamel paints (unit:wt %)

| Raw materials | Example 5 | Comparative Example 3 |
|---|---|---|
| 1. Zinc magnesium titanate obtained in Example 1 | 20.0 | — |
| 2. Titanium dioxide | — | 20.0 |
| 3. Nitrocellulose | 17.0 | 17.0 |
| 4. Lacquer-type phthalic acid resin | 10.0 | 10.0 |
| 5. Dibutyl phthalate | 8.0 | 8.0 |
| 6. Ethyl acetate | 9.0 | 9.0 |
| 7. Butyl acetate | 9.0 | 9.0 |
| 8. Ethyleneglycol monoethyl ether | 3.0 | 3.0 |
| 9. Butyl alcohol | 5.0 | 5.0 |
| 10. Toluene | 19.0 | 19.0 |

Experiment 8

Determination of Weather Resistance Property

To determine the weather resistance property of paints prepared in Example 5 and Comparative Example 3 the following experiment was conducted. The coated film having thickness of 0.1 mm was made on a glass plate using an applicator and then ultraviolet ray was irradiated thereto for 12 hours at the intensity of 765W/m² using Sun Tester (Heraeus, U.S.A.). Thereafter, the change in gloss depending on ultraviolet ray radiation was measured using Gloss Meter (VGS? Nippon Denshoku, Japan) with fixing each of the incident angle and the measuring angle to 60°. The result as obtained is given in the following Table 6.

TABLE 6

Change in gloss degree of the coated film formed from each specimen (unit:%)

| Specimen | Gloss before radiation | Gloss after radiation |
|---|---|---|
| Example 5 | 96 | 91 |
| Comparative Example 3 | 94 | 82 |

From the result described in the above Table 6, it can be seen that the coated film formed from the paint of Example 5 which contains the zinc magnesium titanate inorganic pigment according to the present invention has a good effect of maintaining gloss in comparison to the coated film formed from the paint of Comparative Example 3.

From the experimental results as mentioned above, it can be noted that the novel zinc magnesium titanate of formula (I) according to the present invention is characterized by the reflectivity for most of ultraviolet rays, visible rays and infrared rays and has a very low photocatalytic activity, and therefore, has good properties suitable to inorganic pigments. Therefore, the cosmetic and paint composition containing zinc magnesium titanate according to the present invention reflects ultraviolet rays, visible rays and infrared rays irradiated from sun to inhibit an increase in temperature of the coated product and further displays a good adiabatic property against low temperature and thus, as a result, exhibits the function of regulating the temperature.

What is claimed is:

1. A process for preparing a flake inorganic pigment coated with zinc magnesium titanate defined by the following formula:

$$Zn_{2-x}Mg_x \cdot yTiO_4 \qquad (I)$$

in which x denotes a real number of 0.5 to 1.5; and y denotes an integer of 1 or 2 said process comprising the steps of dispersing a flake inorganic pigment in an aqueous phase, and dissolving water-soluble salts of titanium, zinc and magnesium in the aqueous phase according to the constitutional ratio given in the formula (I) and heating the resulting mixture to a temperature in the range of 40° C. to 80° C., titrating the mixture with an alkali, filtering the mixture, washing the mixture with water, drying the mixture, and sintering the mixture at a temperature in the range of from 700° C. to 1300° C.

2. The process of claim 1, wherein the flake inorganic pigment is one or more selected from the group consisting of talc, mica, sericite and kaolin, the water-soluble salt of titanium is one or more selected from the group consisting of titanium tetrachloride and titanium sulfate, the water-soluble salt of zinc is one or more selected from the group consisting of zinc chloride and zinc sulfate, and the water-soluble salt of magnesium is one or more selected from the group consisting of magnesium nitrate, magnesium chloride and magnesium sulfate.

3. The process of claim 1, wherein the water-soluble salts of titanium, zinc and magnesium are present in an amount ranging from 10 to 60 wt % with respect to the flake inorganic pigment as the base material.

4. The process of claim 2, wherein the water-soluble salts of titanium, zinc and magnesium are present in an amount ranging from 10 to 60 wt % with respect to the flake inorganic pigment as the base material.

5. The process of claim 1, wherein the titration is conducted by adjusting the pH value of the aqueous phase to a value in the range of 7–9.5 with an aqueous solution of at least one of sodium hydroxide, potassium hydroxide and ammonia.

6. The process of claim 1, wherein the powder obtained from said drying step is sintered for a time period within the range of from 1 to 10 hours.